(12) United States Patent
Yamazaki et al.

(10) Patent No.: US 7,029,415 B2
(45) Date of Patent: Apr. 18, 2006

(54) DIFFERENTIAL APPARATUS

(75) Inventors: Yoshinobu Yamazaki, Tokyo-To (JP); Mamoru Murakami, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 10/800,868

(22) Filed: Mar. 16, 2004

(65) Prior Publication Data

US 2004/0185982 A1 Sep. 23, 2004

(30) Foreign Application Priority Data

Mar. 18, 2003 (JP) ............................. 2003-074437

(51) Int. Cl.
*F16H 48/06* (2006.01)
(52) U.S. Cl. ..................................... 475/252
(58) Field of Classification Search ................ 74/460, 74/462; 475/252
See application file for complete search history.

(56) References Cited

U.S. PATENT DOCUMENTS 4,754,661 A * 7/1988 Barnett ...................... 74/459.5
4,939,953 A * 7/1990 Yasui ......................... 475/233

FOREIGN PATENT DOCUMENTS

JP 06-101742 4/1994
JP 11-082680 3/1999

* cited by examiner

*Primary Examiner*—Dirk Wright
(74) *Attorney, Agent, or Firm*—Smith Gambrell & Russell LLP

(57) ABSTRACT

A differential apparatus having a limited slip differential mechanism which comprises a differential case, a pair of side gears housed in the differential case and connected to driving shafts, and pinion gears meshing with the pair of side gears. One of the tooth surfaces of each tooth of the side gears and the pinion gears has a large pressure angle and the other surface has a small pressure angle, such that meshing reaction forces Dr in a drive mode is larger than that of Co in a coast mode to obtain different limiting forces.

7 Claims, 8 Drawing Sheets

(A)

(B)

(A)

(B)

1

DIFFERENTIAL APPARATUS

BACKGROUND OF THE INVENTION

1. Field of the Invention

The present invention relates to a differential apparatus for an automobile, more particularly, to an art which can be effectively applied to a differential apparatus having a limited slip differential mechanism.

2. Related Art

A power train of an automobile for transmitting an engine output to driving wheels comprises various devices such as a start clutch, a transmission, a propeller shaft, and a differential apparatus. A rotational driving force transmitted from the engine to the differential apparatus is distributed to each driving wheel depending on the driving condition of the automobile.

A differential apparatus includes a differential mechanism which enables a smooth driving of the automobile by absorbing a rotational speed difference between the right and left driving wheels when the automobile negotiates curves. The differential mechanism comprises a gear case which is driven by a rotational driving force from the engine, two side gears housed in the gear case and connected to the driving wheels through drive shafts, and two pinion gears which rotate around a pinion shaft fixed on the differential case and mesh with the two side gears. In the gear case, since the pinion gears rotate around a pinion shaft depending on the rotational speed difference between the two side gears, the rotation of the side gears and the driving torque transmitted by the side gears are increased or decreased depending on the rotational resistances applied on them. The differential apparatus can be used to distribute the rotational driving force of the engine to the right and left driving wheels of front and rear axles, and to distribute the rotational driving force of the engine to the front and rear axles in the transmission.

Since the differential apparatus distributes the rotational driving force depending on the driving resistances applied on the driving wheels, when one of the driving wheels slips on a snowy or icy road, almost all of the driving power is distributed to the driving wheel which is slipping on the road. As a result, the total rotational driving force for moving the automobile forward is inevitably reduced.

Therefore, there has been developed a differential apparatus having a limited slip differential mechanism for limiting the differential rotation between two side gears to distribute the rotational driving force to the driving wheel which is not slipping on the road. Such limited slip differential mechanisms are divided into multiple types, including a mechanical friction type which controls a differential rotation using a mechanical friction torque, and a rotational-speed-sensitive type which controls a differential rotation using a viscous fluid which generates a fluidic resistive torque depending on a rotational speed difference between the differential case and the side gears.

In a friction-type limited slip differential mechanism, the side gears and the pinion gears are formed as helical gears, such that the axial component of a meshing reaction force of the helical gears generates a frictional force between an end surface of the pinion gears and a differential case, and the radial component of the meshing reaction force generates a frictional force between tooth tops of the pinion gears and the differential case, to limit the differential function of the differential apparatus (see Japanese Patent Laid-Open Publication No. 101742/1994 (page 3, FIG. 1)).

In another friction-type limited slip differential mechanism, side gears and pinion gears are formed as bevel gears, and tapered rings are interposed between the side gears and a differential case, respectively, such that the axial components of a meshing reaction force of the bevel gears are converted into larger frictional forces between end surfaces of the side gears and the differential case, to limit the differential function of the differential apparatus (see Japanese Patent Laid-Open Publication No. 82680/1999 (page 3, FIG. 1)).

In a rotational-speed-sensitive-type limited slip differential mechanism, a side gear is connected to a differential case by a viscous coupling, such that a shear resistance of a viscous fluid in the viscous coupling is generated depending on a rotational speed difference between the side gear and the differential case, to limit the differential function of the differential apparatus.

However, in the above-described limited slip differential mechanisms, the meshing reaction force and the shear resistance of the viscous fluid are the same in a drive mode, in which the rotational driving force is transmitted from the pinion gear to the side gear, and in a coast mode, in which the rotational driving force is transmitted from the side gear to the pinion gear. As a result, it is difficult to set a difference in the differential limiting forces between the drive mode, in which a driver of the automobile depresses an accelerator pedal, and the coast mode, in which the driver releases the accelerator pedal to apply an engine brake.

Further, if the differential limiting force in the drive mode is reduced, the loss of a driving power deteriorates the acceleration performance of the vehicle when the vehicle starts or exits curve. Although the acceleration performance in the drive mode can be raised by increasing the differential limiting force in the drive mode, this, in turn, deteriorates the turning performance when the vehicle slows down and enters the curve due to the increase of the differential limiting force in the coast mode. Thus, it is difficult to raise the performance of the vehicle both in the drive mode and in the coast mode with the differential apparatus which generates the same differential limiting force in the drive mode and in the coast mode.

SUMMARY OF THE INVENTION

Therefore, it is an object of the present invention to improve the performance of an automobile by providing a differential apparatus having a limited slip differential mechanism which is capable of generating a larger difference between a differential limiting force in a drive mode and that in a coast mode.

To achieve the above-mentioned object, according to a first aspect of the present invention, a differential apparatus for distributing a rotational driving force from a transmission output shaft to a first driving wheel and a nsecond driving wheel comprises:

a first driving shaft connected to the first driving wheel;

a second driving shaft connected to the second driving wheel;

a driven gear disposed on the first driving shaft; and a driving gear which is positioned near the transmission output shaft to be meshed with the driven gear; wherein adjacent tooth surfaces of the driving gear are formed to have different pressure angles from each other, and a differential limiting force is generated by a meshing reaction force which is varied depending on a meshing direction of the driving gear.

According to a second aspect of the present invention, the differential apparatus comprises:

a differential case connected to the transmission output shaft;

a first driving gear which is housed in the differential case to be meshed with a first driven gear disposed on the first driving shaft;

a second driving gear which is housed in the differential case to be meshed with a second driven gear disposed on the second driving shaft; and an intermediate gear which is integrally disposed on the second driving gear to be meshed with the first driving gear.

According to a third aspect of the present invention, the differential apparatus further comprises:

a carrier which is connected to the second driving shaft to rotatably support the driving gear; and an intermediate gear which is integrally disposed on the driving gear to be meshed with an output gear disposed on the transmission output shaft.

According to a 4th aspect of the present invention, the differential apparatus further comprises a differential case which houses the driving gear therein, and is connected to the transmission output shaft; wherein the driving gear is meshed with both the first driven gear connected to the first driving shaft, and the second driven gear connected to the second driving shaft.

According to a 5th aspect of the present invention, a tooth surface of the driving gear for transmitting a rotational driving force in a drive mode is formed to have a larger pressure angle than that of a tooth surface to which the rotational driving force is transmitted during a coast mode.

According to a 6th aspect of the present invention, the driving gear is formed in a cylindrical shape, and a differential limiting force is generated by a radial meshing reaction force which is applied to the driving gear.

According to a 7th aspect of the present invention, the differential limiting force is a frictional force generated in the driving gear and a housing bore of the differential case housing the driving gear.

According to an 8th aspect of the present invention, the differential limiting force is a frictional force generated in the driving gear and a support shaft of the carrier supporting the driving gear.

According to a 9th aspect of the present invention, the driving gear, the first driven gear, and the second driven gear are formed as bevel gears, and a differential limiting force is generated by a meshing reaction force applied to the first and the second driven gears in a thrust direction.

According to a 10th aspect of the present invention, a friction generating member is disposed between the first driven gear and the differential case, and a friction reducing member is disposed between the second driven gear and the differential case.

According to an 11th aspect of the present invention, a first friction generating member is disposed between the first driven gear and the differential case, and a second friction generating member is disposed between the second driven gear and the differential case, the second friction generating member generating a smaller friction than that of the first friction generating member.

According to a 12th aspect of the present invention, a larger meshing reaction force is applied to the first driven gear in a thrust direction in a drive mode, than that during a coast mode.

According to a 13th aspect of the present invention, the friction generating member is a friction clutch.

According to a 14th aspect of the present invention, the friction generating member is a tapered ring.

In the differential apparatus according to the present invention, since adjacent tooth surfaces of the driving gear are formed to have different pressure angles from each other, different meshing reaction forces can be generated according to the meshing direction of the driven gear with the driving gear. Thus, a difference in differential limiting forces can be set by the meshing reaction forces.

As a result, a large difference in the differential limiting forces can be set between a drive mode and a coast mode. For example, when a larger differential limiting force is set in a drive mode, while a smaller differential limiting force is set during a coast mode, contradictory performances of an automobile such as the turning performance and the acceleration performance can be made compatible with each other at high levels, so that the power performance of the automobile can be enhanced.

DETAILED DESCRIPTION OF THE INVENTION

Embodiments of the present invention are described in detail herebelow with reference to the drawings.

Figure 1:
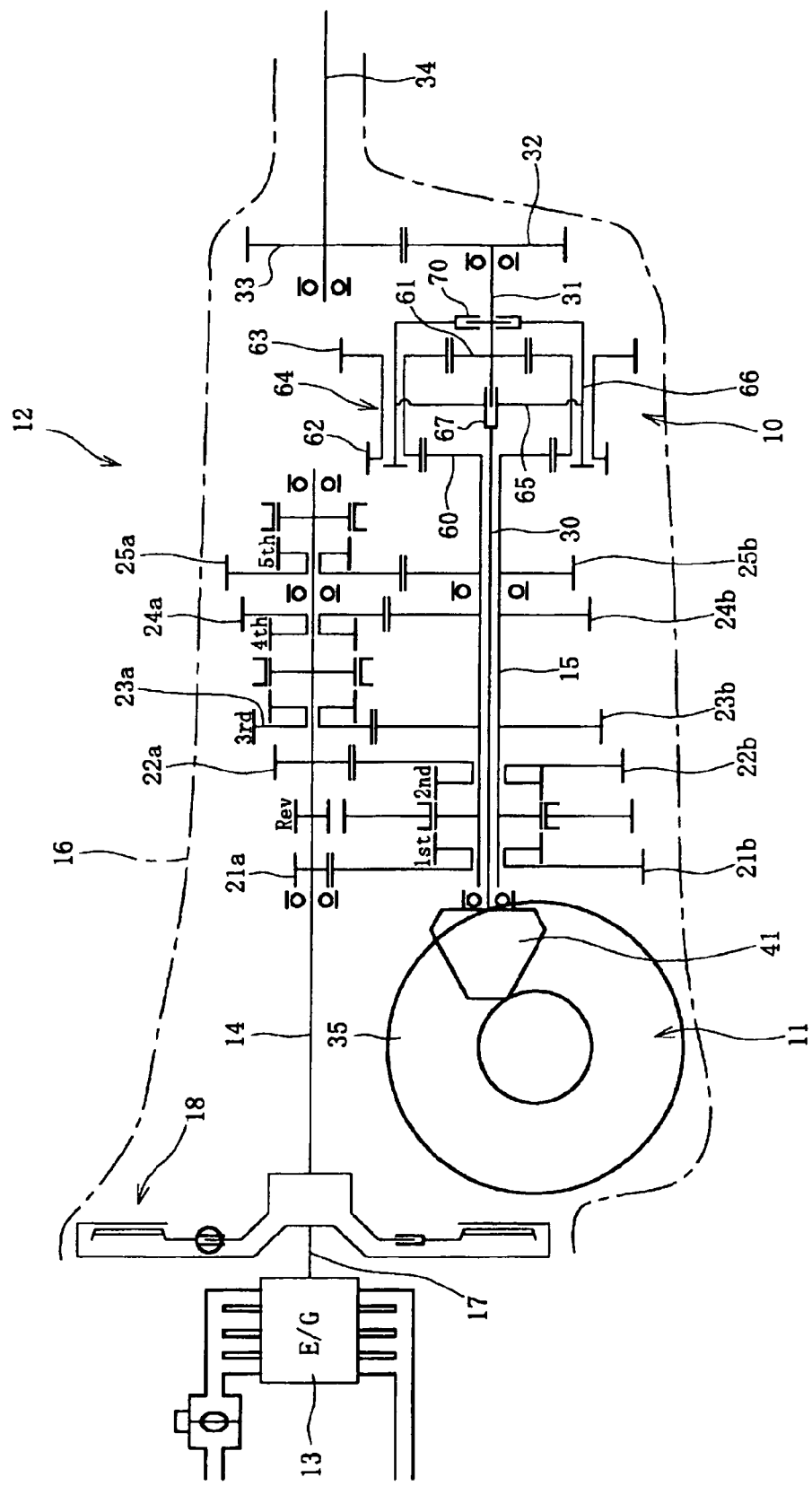
FIG. 1 is a skeleton view showing a manual transmission having a differential apparatus of one embodiment according to the present invention.

FIG. 1 is a skeleton view showing a manual transmission 12 of an automobile including differential apparatus 10 and 11 of one embodiment according to the present invention. As shown in FIG. 1, the manual transmission 12 includes an input shaft 14 connected to an engine 13, and an output shaft 15 as a transmission output shaft connected to driving wheels in parallel with the input shaft 14. These input shaft 14 and the output shaft 15 are housed in a transmission case 16 extending in a running direction of the automobile. The manual transmission 12 is disposed along a longitudinal axis of the automobile and comprises a power train of the four-wheel-drive automobile.

A crank shaft 17 outputting an engine power is connected to the input shaft 14 through a start clutch 18. Transmission gears 21a and 22a for a first speed and a second speed are secured to the input shaft 14. Transmission gears 23a to 25a for a third speed to a fifth speed are rotatably attached to the input shaft 14. Transmission gears 21b and 22b for a first speed and a second speed are rotatably attached to the output shaft 15. Transmission gears 23b to 25b for a third speed to a fifth speed are secured to the output shaft 15. The driving transmission gears 21a to 25a disposed on the input shaft 14 are meshed with the driven transmission gears 21b to 25b disposed on the output shaft 15 so as to form speed change gear rows from a first speed to a fifth speed. When the speed change gear rows are shifted to a driving force transmitting mode, a synchro-meshing mechanism is actuated by the operation of a driver of the automobile.

An engine power shifted through the speed change gear rows is inputted from the output shaft 15 to the center differential apparatus 10. A front wheel output shaft 30 connected to the output shaft 15 via the center differential apparatus 10 is housed in the hollow output shaft 15. The front differential apparatus 11 is connected to a front end of the front wheel output shaft 30 extending forward through the manual transmission 12. Front wheels and the front wheel output shaft 30 are connected to each other through the front differential apparatus 11. A rear wheel output shaft 31 connected to the output shaft 15 via the center differential apparatus 10 is connected to a rear wheel driving shaft 34 via two transmission gears 32, 33. The rear wheel driving shaft 34 extends rearward from the manual transmission 12, and is connected to rear wheels through a rear differential apparatus not shown.

In this way, the shifted engine power is distributed to the front wheels and the rear wheels via the center differential apparatus 10, and is distributed to respective right and left wheels of the front or the rear wheels via the front differential apparatus 11 or the rear differential apparatus.

Figure 2:
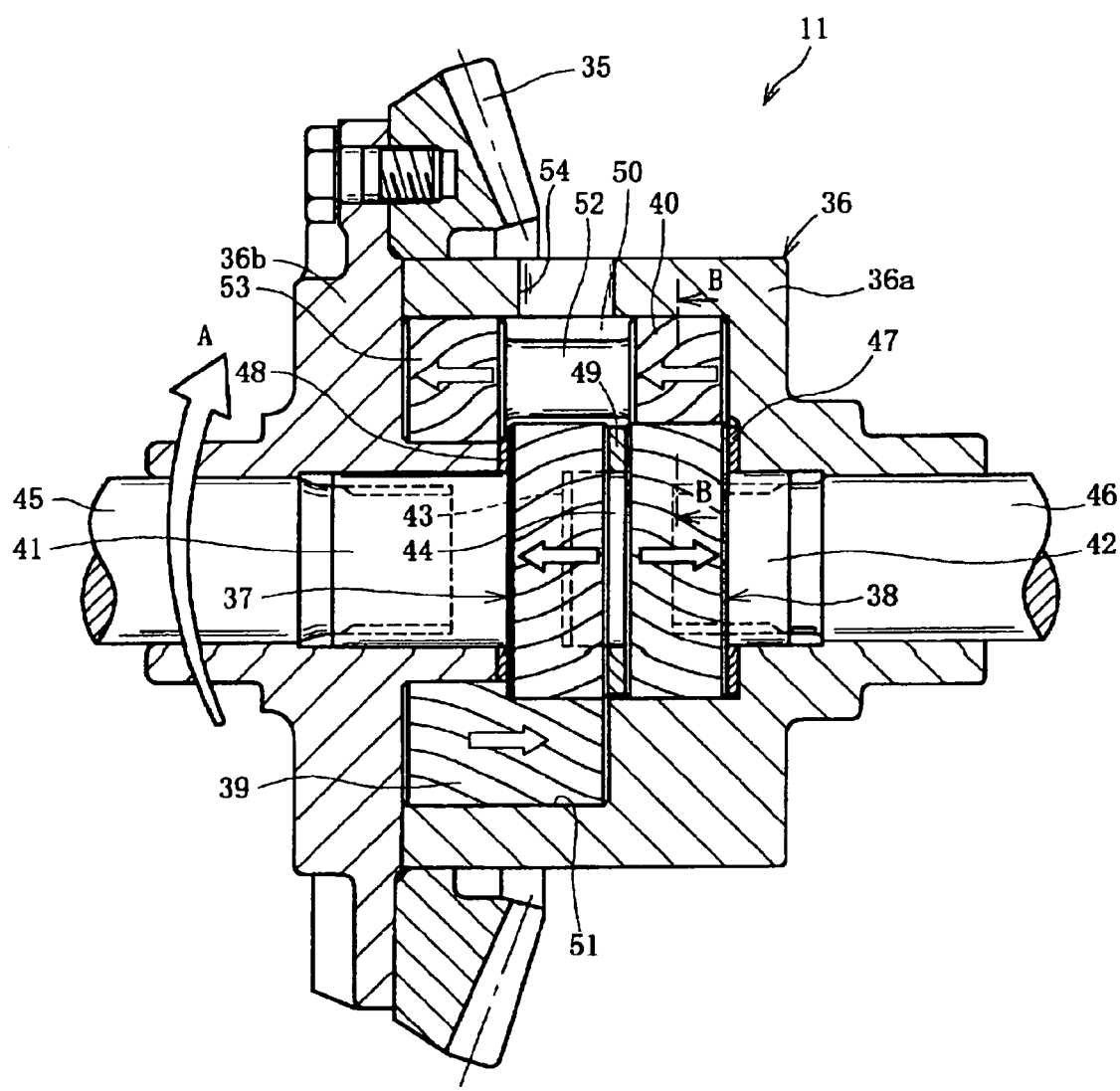
FIG. 2 is a cross-sectional view of a front differential apparatus shown in FIG. 1.

FIG. 2 is a cross-sectional view of the front differential apparatus 11 shown in FIG. 1. The front differential apparatus 11 is an embodiment of the present invention. As shown in FIG. 2, the front differential apparatus 11 includes a differential case 36 to which a ring gear 35 is secured. In the differential case 36, side gears 37, 38 as driven gears are connected to the respective right and left driving wheels, and pinion gears 39, 40 as driving gears mesh with the side gears 37, 38. That is, the side gears 37, 38 serve as large differential gears, and the pinion gears 39, 40 serve as small differential gears. These side gears 37, 38 and the pinion gears 39, 40 are formed as cylindrical helical gears.

The differential case 36 includes a case body 36a and a case cover 36b. The case body 36a houses therein side gears 37, 38, and the pinion gears 39, 40. The ring gear 35 is secured to the case cover 36b. The ring gear 35 is disposed to mesh with a drive pinion gear 41 disposed on a front end of the front wheel output shaft 30. Thus, the differential case 36 is rotationally driven by the rotational driving force transmitted from the output shaft 15 to the front wheel output shaft 30.

The two side gears 37, 38 housed in the differential case 36 have hollow shaft portions 41, 42, respectively, and are rotatably supported on the differential case 36 at these shaft portions 41, 42. A fitting hole 43 is formed in an end surface of the side gear 37, while a fitting shaft 44 is formed in an opposed end surface of the side gear 38. Free ends of the side gears 37, 38 support each other by inserting the fitting shaft 44 in the fitting hole 43. Front wheel driving shafts 45, 46 as a first and a second driving shafts are spline-connected to the shaft parts 41, 42 of the respective side gears 37, 38. These front wheel driving shafts 45, 46 are rotatably secured to the differential case 36. The front wheel driving shaft 45 is connected to a left front wheel as a first driving wheel, while the front wheel driving shaft 46 is connected to a right front wheel as a second driving wheel. Thrust washers 47 and 48 are mounted between end surfaces of the side gears 37, 38 and the differential case 36. A thrust washer 49 is mounted between the two side gears 37, 38.

As shown in FIG. 2, in the differential case 36a, a plurality of axially extending housing bores 50, 51 are formed radially outward the side gears 37, 38. The longer housing bore 50 and the shorter housing bore 51 are circumferentially adjacent to each other to form a pair of housing bores. A plurality of pairs of housing bores are circumferentially arranged with an equal gap therebetween. The pinion gears 39, 40 are rotatably housed respectively in the longer and shorter housing bores forming a pair of housing bores. The pinion gears 39, 40 are slidably held in the housing bores 50, 51 so as to contact with the inner peripheral surfaces of the housing bores 50, 51.

The pinion gear 40 as the second driving gear housed in the longer housing bore 50 is disposed to mesh with the side gear 38 as the second driven gear. A pinion gear 53 as an intermediate gear is integrally disposed on the pinion gear 40 through a connecting shaft 52, the pinion gear 53 also being formed as a helical gear. The pinion gear 39 as the first driving gear housed in the shorter housing bore 51 is disposed to mesh with the pinion gear 53 and with the side gear 37 as the first driven gear. That is, the side gears 37, 38 are connected to each other through the three pinion gears 39, 40, and 53. When one side gear 37 is rotated, the other side gear 38 is reversely rotated through the three pinion gears 39, 40, and 53. A lubrication oil supply hole 54 passing through outside is formed in the differential case 36. With the rotation of the differential case 36, the lubrication oil in the transmission is supplied to the respective housing bores 50 and 51 so that the respective gears are lubricated.

An operation of the front differential apparatus 11 is described below. When the differential case 36 is driven in rotation by the rotational driving force transmitted from the front wheel output shaft 30, the pinion gears 39, 40, and 53 held in the housing bores 50, 51 revolve together with the differential case 36. Since the revolutions of the pinion gears 39, 40, and 53 are transmitted to the two side gears 37, 38 meshing therewith, the rotation of the differential case 36 is transmitted to the driving wheels via the pinion gears 39, 40, and 53, and the side gears 37, 38. In this condition, the same driving torques are distributed to the right and left driving wheels.

When the automobile negotiates curves or runs on a snowy or icy road, for example, respective rolling resistances applied on the right and left driving wheels are different from each other. Thus, the rotational speeds of the right or left driving wheels increase or decrease depending on the rolling resistances applied on them. Then, the two side gears 37, 38 relatively rotate by the differential rotations of the pinion gears 39, 40, and 53. Thus, a rotational speed of the driving wheel with a larger rolling resistance is decreased, while a rotational speed of the driving wheel with a smaller rolling resistance is increased. As a result, unnecessary slip of the driving wheels can be prevented, and a stable driving performance can be obtained.

Figure 3:
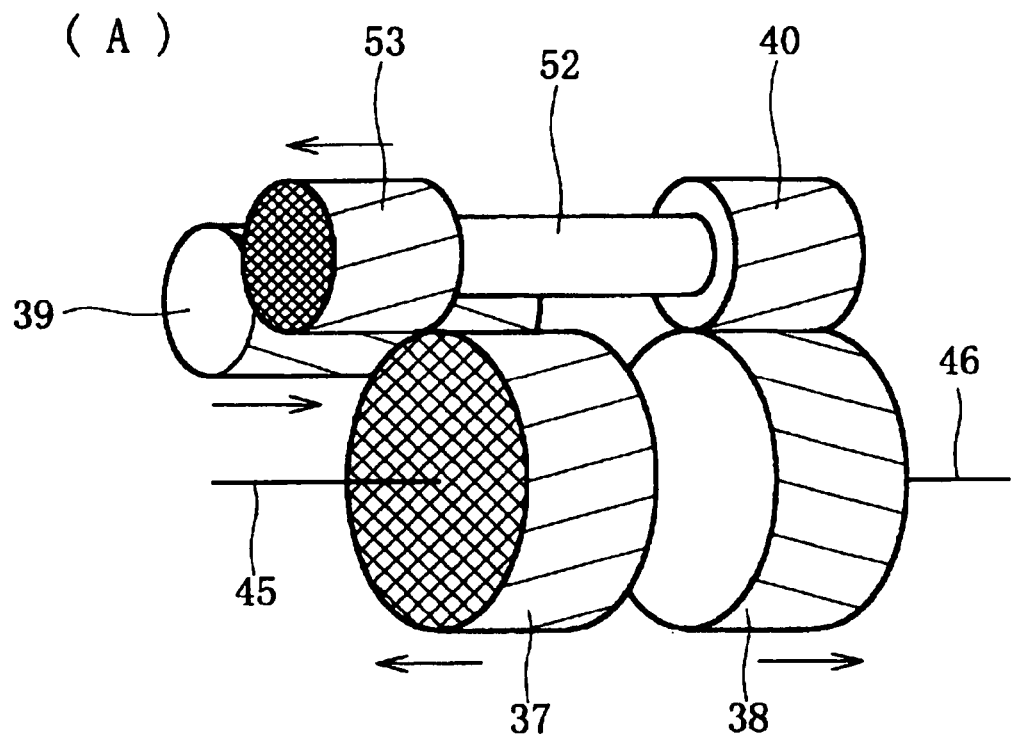
FIG. 3(A) is a schematic view showing a meshing reaction force operating in a thrust direction.
FIG. 3(B) is a schematic view showing a meshing reaction force operating in a radial direction.
Figure 3:
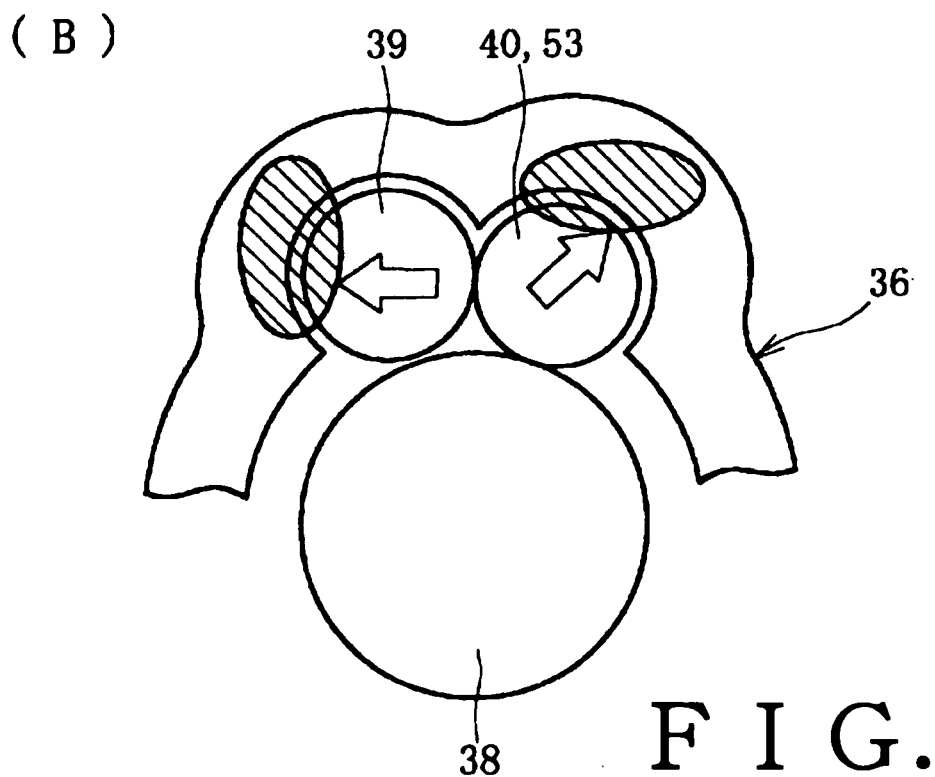

The front differential apparatus 11 can generate a differential limiting force which limits relative rotations of the side gears 37, 38 by limiting the differential rotations of the pinion gears 39, 40, and 53. Since the side gears 37, 38 and the pinion gears 39, 40 and 53 are formed as helical gears, these side gears and the pinion gears generate meshing reaction forces in thrust and radial directions. FIG. 3(A) is a schematic view showing a meshing reaction force generated in a thrust direction, and FIG. 3(B) is a schematic view showing a meshing reaction force generated in a radial direction.

As shown in FIG. 3(A), by the meshing of the pinion gears 39, 40 and 53 with the side gears 37, 38, meshing reaction forces in a thrust direction indicated by the arrows are generated in the respective gears. These meshing reaction forces generate a frictional force between the housing bores 50, 51 of the differential case 36 and the end surfaces of the pinion gears 53 and 39 which provide a differential limiting force. Note that the thrust reaction force shown in FIG. 3(A) is generated when the differential case 36 is driven in rotation in the direction indicated by the arrow A shown in FIG. 2.

As shown in FIG. 3(B), by the meshing of the pinion gears 39, 40 and 53 with the side gears 37, 38, meshing reaction forces in a radial direction indicated by the arrows are generated. These meshing reaction forces generate a frictional force between the housing bores 50, 51 of the differential case 36 and tooth tops of the pinion gears 39, 40 and 53 that provide the differential limiting force.

Figure 4:
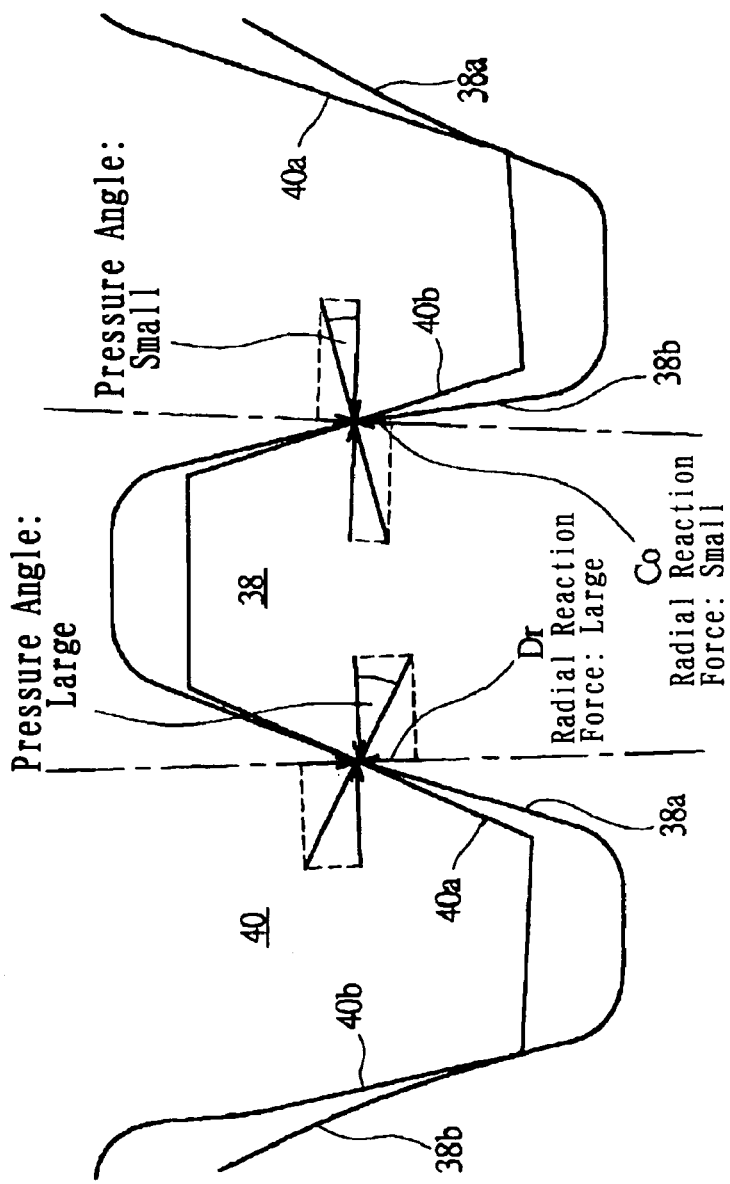
FIG. 4 is a schematic view showing a meshing of a side gear with a pinion gear along the B—B line in FIG. 2.

FIG. 4 is a schematic view showing a meshing of the side gear 38 with the pinion gear 40 along the B—B line in FIG. 2. The arrows shown in FIG. 4 respectively indicate a direction to which the pinion gear 40 drives the side gear 38 in a drive mode in which the accelerator pedal is depressed to move the automobile forward, and a direction to which the side gears 38 drives the pinion gear 40 in a coast mode in which the accelerator pedal is released. As shown in FIG. 4, in the drive mode, since a rotational driving force is transmitted from the pinion gear 40 to the side gear 38, a tooth surface 40a of the pinion gear 40 and a tooth surface 38a of the side gear 38 are brought into contact with each other. On the other hand, in a coast mode, since a rotational driving force is transmitted from the side gear 38 to the pinion gear 40, a tooth surface 40b of the pinion gear 40 and a tooth surface 38b of the side gear 38 are brought into contact with each other.

As shown in FIG. 4, a tooth shape of the pinion gear 40 as the driving gear is formed such that the pressure angles on the front surface and the rear surface are asymmetric. That is, the adjacent tooth surfaces 40a and 40b of the pinion gear 40 are formed to have different pressure angles from each other. Corresponding to the pinion gear 40, a tooth shape of the side gear 38 is formed such that the pressure angles of the tooth surface 38a and the tooth surface 38b are different from each other. The pressure angles of the tooth surfaces 38a and 40a which are brought into contact with each other in a drive mode are formed larger than the pressure angles of the tooth surfaces 38b and 40b which are brought into contact with each other during a coast mode. Not only the tooth shapes of the pinion gear 40 and the side gear 38, but also tooth shapes of the pinion gear 39 and the side gear 37 are formed such that pressure angles on the front surface and the rear surface are asymmetric in the same manner.

A meshing reaction force in a radial direction generated by the meshing of the pinion gear 40 with the side gear 38 is described below. In the drive mode, since a rotational driving force is transmitted from the tooth surface 40a to the tooth surface 38a, a meshing reaction force in a radial direction is generated which is indicated by the arrow Dr shown in FIG. 4. On the other hand, in the coast mode, when a rotational driving force is transmitted from the tooth surface 38b to the tooth surface 40b, a meshing reaction force in a radial direction is generated which is indicated by the arrow Co.

As shown in FIG. 4, in the drive mode, a radial reaction force Dr larger than a radial reaction force Co is generated by the meshing of the tooth surface 38a with the tooth surface 40a in which the larger pressure angles are set. On the other hand, in the coast mode, the radial reaction force Co smaller than the radial reaction force Dr is generated by the meshing of the tooth surface 38b with the tooth surface 40b in which the smaller pressure angles are set. As shown in FIG. 3(B), the radial reaction forces Dr and Co generate a differential limiting force between the housing bore 50 of the differential case 36 and the tooth top of the pinion gear. Thus, it is possible to create a difference between differential limiting forces in the drive mode and in the coast mode.

As described above, in addition to the thrust reaction forces generated in the drive mode and in the coast mode, the larger radial reaction force Dr is generated in a drive mode, while the smaller radial reaction force Co is generated in the coast mode. Since these reaction forces generate differential limiting forces between the respective gears and the differential case 36, a larger differential limiting force can be set in the drive mode than the differential limiting force in the coast mode.

When the differential limiting forces are set in this manner, contradictory performances of a automobile such as the turning performance and the acceleration performance can be made compatible with each other at high levels, so that the power performance of the automobile can be enhanced. That is, when the accelerator pedal is released for entering a curve or the like, a differential limiting force of the differential apparatus 11 can be decreased. As a result, factors which prevent turning of the automobile can be reduced, and thus the turning performance of the automobile such as turn-in crispness can be raised.

When the differential limiting force in the coast mode is set to be small, the differential limiting force in the drive mode can be set to be large. Thus, when an accelerator pedal is depressed for starting or exiting a curve, the differential limiting force of the differential apparatus 11 can be increased. Thus, the loss of the driving torque transmitted to the driving wheels can be prevented so that stable acceleration performance can be realized.

In addition, unnecessary differential limiting force can be reduced in the coast mode so as to improve fuel consumption. Since the reduction of the differential limiting force makes it possible to independently control the rotational speed and the driving torque of the driving wheels, a differential apparatus 11 that does not prevent the operation of an anti-lock brake system can be achieved.

Further, the differential apparatus 11 needs no additional components, only the pressure angles of the pinion gears 39, 40 being asymmetrically formed. Thus, an increase of the cost for the differential apparatus 11 can be restrained, while enhancing the power performance of the automobile.

Figure 5:
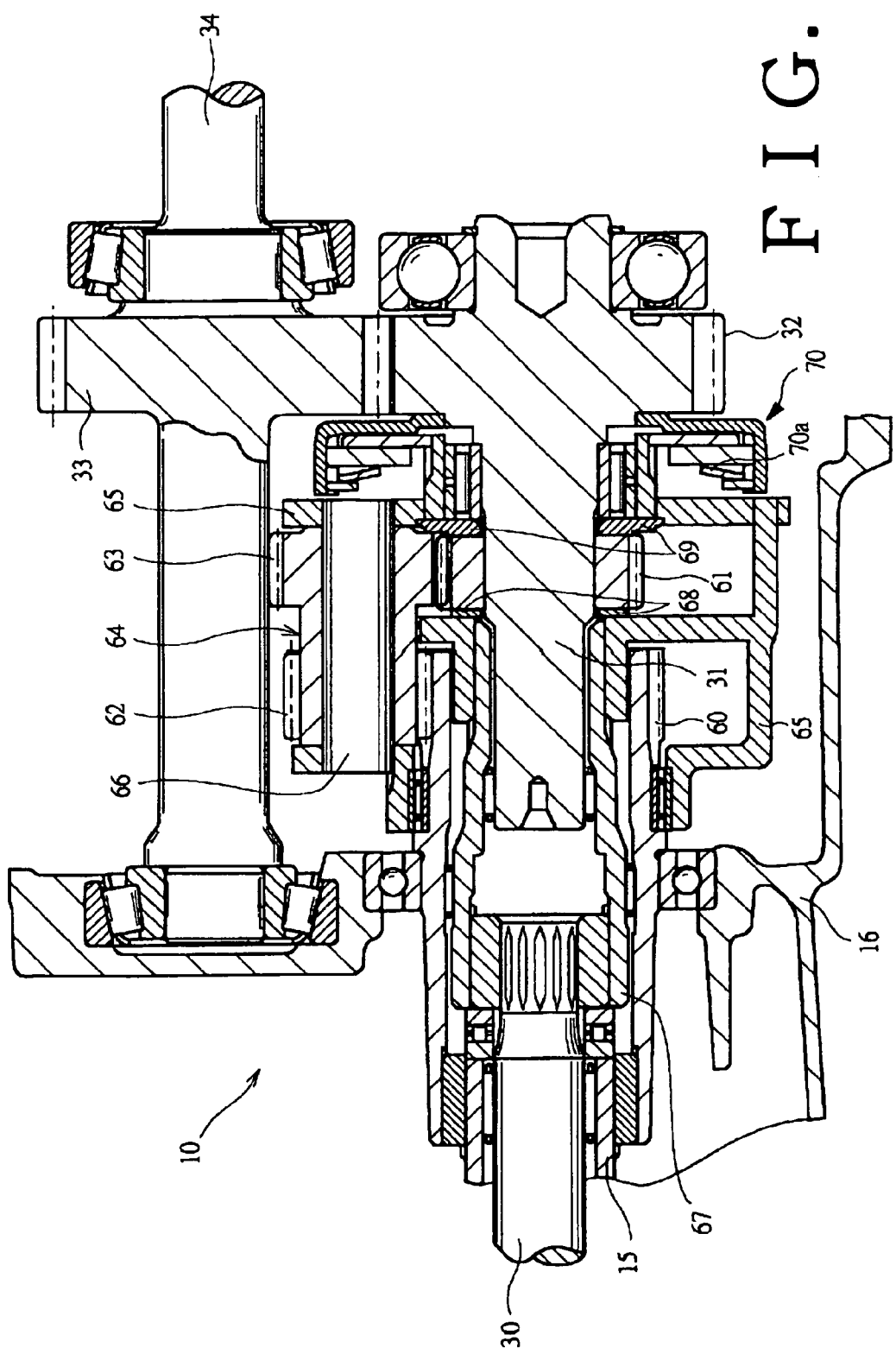
FIG. 5 is a cross-sectional view showing a center differential apparatus shown in FIG. 1.

FIG. 5 is a cross-sectional view showing the center differential apparatus 10 shown in FIG. 1. The center differential apparatus 10 is another embodiment of the present invention. As shown in FIG. 1, the center differential apparatus 10 is mounted among the output shaft 15, the front wheel output shaft 30, and the rear wheel output shaft 31 of the transmission. The center differential apparatus 10 distributes a rotational driving force to rear wheels as first driving wheels and front wheels as second driving wheels. The center differential apparatus 10 is a compound epicyclic or planetary gear type. A sun gear 60 as an output gear is disposed on an end of the output shaft 15 as a transmission output shaft. A sun gear 61 as a driven gear, i.e., a side gear, is disposed on the rear wheel output shaft 31 as a first driving shaft.

A pinion gear 62 as an intermediate gear to be meshed with the sun gear 60 and a pinion gear 63 as a driving gear, i.e., a pinion gear to be meshed with the sun gear 61, are disposed radially outward from the sun gears 60 and 61. The pinion gears 62 and 63 are integrally disposed to form unitary pinion gears 64. The unitary pinion gears 64 are circumferentially arranged, and each of the unitary pinion gears 64 is rotatably supported by a carrier 65 through a support shaft 66. The front wheel output shaft 30 as the second driving shaft is connected to the carrier 65 through a hollow connecting shaft 67. Thus, the rotation of the carrier 65 directly provides the rotation of the front wheel output shaft 30. Although the pinion gears 62 and 63 are formed as cylindrical helical gears, they may be formed as spur gears.

When a shifted rotational driving force is inputted from the output shaft 15 to the sun gear 60, driving torques are distributed to the carrier 65 and the rear wheel output shaft 31 according to meshing pitch radii of the sun gears 60 and 61 with the pinion gears 62 and 63. A rotational driving force is transmitted from the carrier 65 to the front wheels through the front wheel output shaft 30, and a rotational driving force is transmitted from the rear wheel output shaft 31 to the rear wheels through the rear wheel driving shaft 34. Since the unitary pinion gears 64 are rotated in a sun-and-planet manner, a rotational difference between the front wheels and rear wheels when the automobile turns can be differentially absorbed.

Frictional members 68 and 69 are respectively disposed on both sides of the sun gear 61. The frictional members 68 and 69 connect the rear wheel output shaft 31 to the carrier 65 by means of a thrust force caused by the meshing of the sun gear 61. A differential limiting clutch 70 is disposed between the rear wheel output shaft 31 and the carrier 65. The differential limiting clutch 70 connects the rear wheel output shaft 31 to the carrier 65 by means of a spring force of a disc spring 70a. Since frictional forces generated in the frictional members 68 and 69 and a frictional force generated in the differential limiting clutch 70 control the relative rotations of the rear wheel output shaft 31 and the carrier 65, these frictional forces provide a differential limiting force for controlling planetary rotations of the unitary pinion gears 64.

The illustrated center differential apparatus 10 distributes more driving torque to the rear wheels such that it resembles a rear wheel drive automobile. By limiting the planetary rotations of the unitary pinion gears 64, a ratio of a driving torque to be supplied to the front wheels can be increased.

Similar to the above-described pinion gears 39, 40 of the front differential apparatus 11, a tooth shape of each of the pinion gears 62 and 63 housed in the center differential apparatus 10 is formed such that the pressure angles on the front surface and the rear surface are asymmetric. With respect to the tooth shapes of the sun gears 60 and 61 to be meshed with the pinion gears 62 and 63, the pressure angles are asymmetrically formed so as to correspond to the pinion gears 62 and 63. Among these pressure angles, the pressure angles on the respective tooth surfaces which are brought into contact with each other in a drive mode are formed larger than those on the respective tooth surfaces which are brought into contact with each other during a coast mode. In a drive mode, a rotational driving force is transmitted from the sun gear 60 to the sun gear 61 through the unitary pinion gears 64. During a coast mode, a rotational driving force is transmitted from the sun gear 61 to the sun gear 60 through the unitary pinion gears 64.

Accordingly, in a drive mode, a larger radial meshing reaction force is applied to the unitary pinion gears 64, while during a coast mode, a radial meshing reaction force smaller than that in a drive mode is applied thereto. Since the radial reaction force increases a friction force at a contacting surface of internal diameters of the unitary pinion gears 64 and the support shaft 66, the radial reaction force provides such force that limits rotations of the unitary pinion gears 64 relative to the carrier 65. The limitation of the rotations of the unitary pinion gears 64 limits planetary rotations of the unitary pinion gears 64 going around the sun gears 60 and 61. Thus, a frictional force between the unitary pinion gears 64 and the support shaft 66 provides a differential limiting force. That is, a larger differential limiting force can be generated between the unitary pinion gears 64 and the support shaft 66 in a drive mode than that during a coast mode.

By varying a differential limiting force of the center differential apparatus 10 between that in a drive mode and that in a coast mode, the differential limiting force of the differential apparatus can be reduced when an accelerator is off when entering a corner. Thus, a rotational difference between the front wheels and the rear wheels can be differentially absorbed so that the turning performance of the automobile can be improved. Especially, advantages of the center differential apparatus 10 of an epicyclical or planetary gear type, which has characteristics like those of a rear drive automobile by distributing unequal torques to the front and rear wheels, can be fully executed when driving in a turn.

When an accelerator is on, such as in starting or escaping a corner, a differential limiting force of the differential apparatus can be increased. Thus, the planetary rotations of the unitary pinion gears 64 can be limited, so that a full rotational driving force is transmitted to the front wheels and the rear wheels. Thus, the stable acceleration performance found in a four-wheel drive automobile can be realized.

Figure 6:
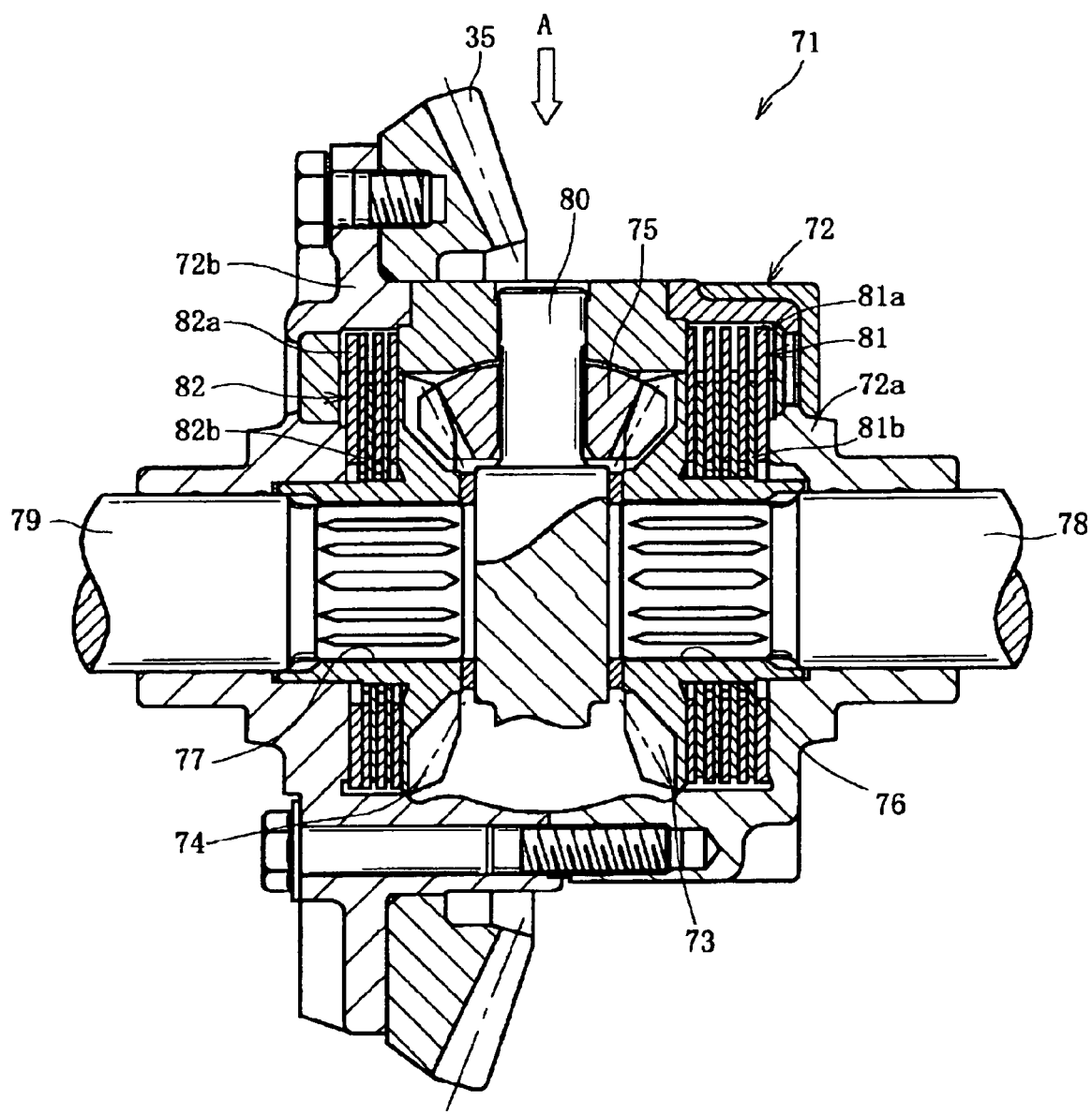
FIG. 6 is a cross-sectional view showing a differential apparatus of another embodiment according to the present invention.

FIG. 6 is a cross-sectional view showing a front differential apparatus 71 of another embodiment according to the present invention. As shown in FIG. 6, the front differential apparatus 71 includes a differential case 72 on which a ring gear 35 is secured. Side gears 73 and 74 and a pinion gear 75 are rotatably housed in the differential case 72. The side gears 73 and 74 as driven gears are respectively connected to right and left driving wheels. The pinion gear 75 as a driving gear is meshed with the side gears 73 and 74. These side gears 73 and 74, and the pinion gear 75 are formed as bevel gears.

The differential case 72 has a case body 72a and a case cover 72b. The case body 72a houses therein a plurality of side gears 73 and 74 and a pinion gear 75. The ring gear 35 is secured on the case cover 72b. The ring gear 35 is disposed to mesh with a drive pinion gear 41 disposed on a top of the front wheel output shaft 30. Thus, the differential case 72 is driven in rotation by a rotational driving force transmitted from the output shaft 15 to the front wheel output shaft 30.

The side-gears 73 and 74 as first and second driven gears housed in the differential case 72 respectively have spline holes 76 and 77 formed therein. Front wheel driving shafts 78 and 79 as first and second driving shafts are spline-connected to the spline holes 76 and 77, respectively. The front wheel driving shafts 78 and 79 are rotatably supported on the differential case 72. The front wheel driving shaft 78 is connected to a right front wheel as a first driving wheel, while the front wheel driving shaft 79 is connected to a left front wheel as a second driving wheel.

A pinion shaft 80 is fitted in the case body 72a, and the pinion gear 75 is rotatably supported by the pinion shaft 80. The pinion gear 75 is disposed to mesh both the side gears 73 and 74. When one side gear 73 is rotated, the other side gear 74 is reversely rotated through the pinion gear 75.

Multiple disc clutches 81 and 82 as friction generating members are disposed between the differential case 72 and the side gears 73 and 74. These multiple disc clutches 81 and 82 serve as frictional clutches, and respectively have a plurality of friction plates 81a and 82a and friction discs 81b and 82b which are alternately laid on each other. The friction plates 81a and 82a of the multiple disc clutches 81 and 82 are mounted in the differential case 72 in an axially movable manner, while the friction discs 81b and 82b are respectively mounted on the side gears 73 and 74 in an axially movable manner.

An operation of the front differential apparatus 71 is described below. When the differential case 72 is driven in rotation by a rotational driving force transmitted from the front wheel output shaft 30, the pinion gear 75 supported by the pinion shaft 80 is revolved together with the differential case 72. Since the revolution of the pinion gear 75 is transmitted to the two side gears 73 and 74 which are meshed therewith, the rotation of the differential case 72 is transmitted to the driving wheels through the pinion gear 75 and the side gears 73 and 74. In this state, equal driving torques are distributed to the right and left driving wheels. When driving in a turn, since the side gears 73 and 74 are relatively rotatable, it is possible to decrease a rotational speed of a driving wheel having a larger rolling resistance, while increasing a rotational speed of a driving wheel having a smaller rolling resistance. Thus, a differential rotation between the driving wheels can be readily allowed, so that the stable turning performance can be realized.

Figure 7:
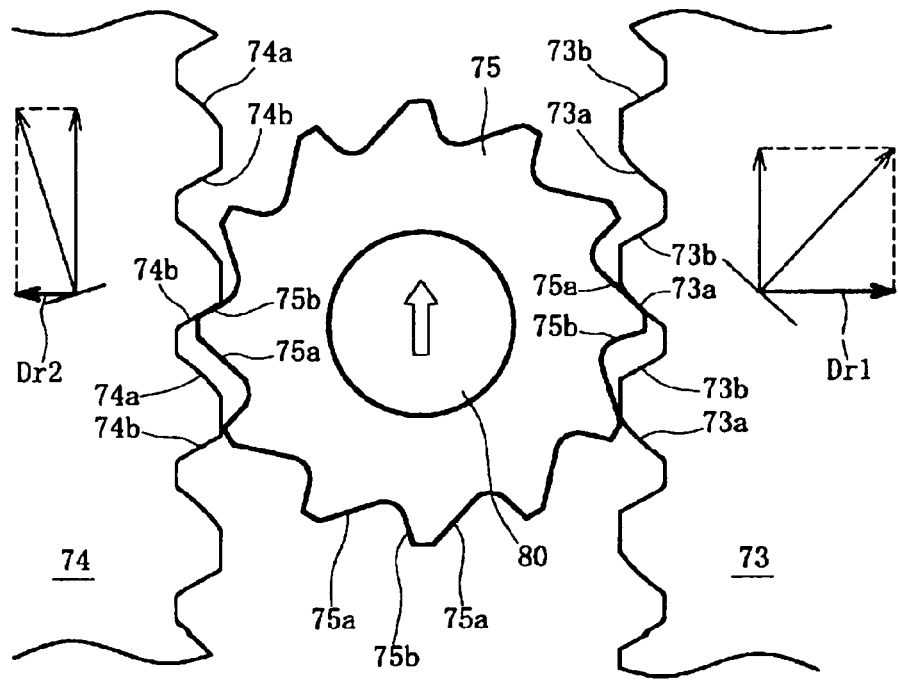
FIG. 7(A) is a schematic view showing a meshing condition of a pinion gear with side gears shown from the arrow A in FIG. 6.
FIG. 7(B) is a schematic view showing a meshing condition of a pinion gear with side gears shown from the arrow A in FIG. 6.
Figure 7:
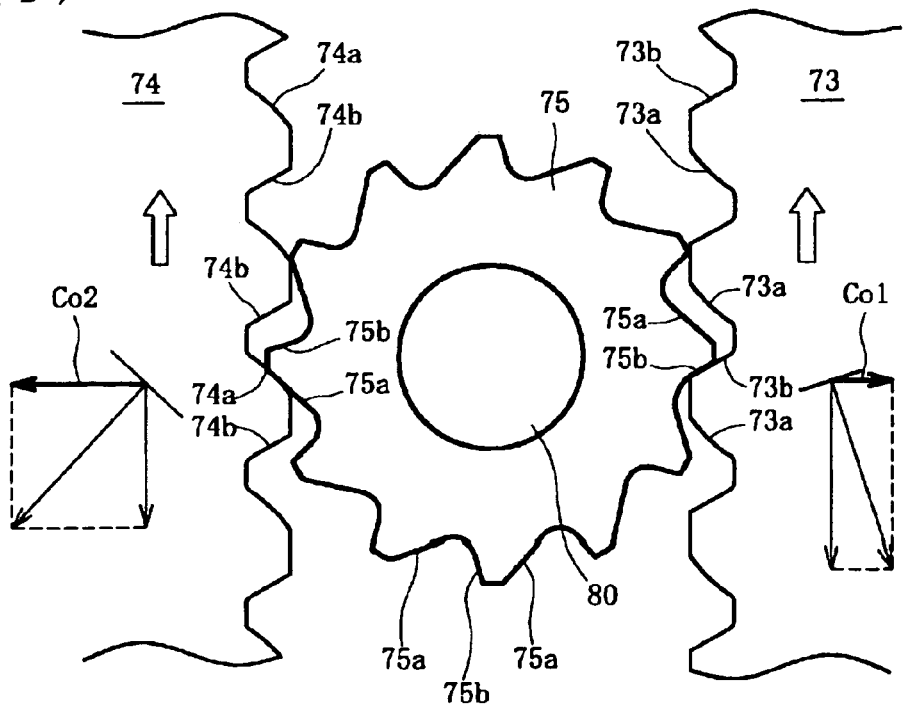

The front differential apparatus 71 can generate a differential limiting force because it limits relative rotations of the side gears 73 and 74. Next, processes of generating a differential limiting force are described. FIGS. 7(A) and 7(B) are schematic views showing a meshing condition of the pinion gear 75 with the side gears 73 and 74 shown from the arrow A in FIG. 6. FIG. 7(A) shows a meshing condition in a drive mode, and FIG. 7(B) shows a meshing condition during a coast mode.

As shown in FIG. 7(A), a tooth shape of the pinion gear 75 as the driving gear is formed such that the pressure angles on the front surface and the rear surface are asymmetric. That is, adjacent tooth surfaces 75a and 75b of the pinion gear 75 are formed to have different pressure angles from each other. With respect to tooth shapes of the side gears 73 and 74, pressure angles of tooth surfaces 73a and 74a are formed different from those of tooth surfaces 73b and 74b to correspond to the pinion gear 75. In the pinion gear 75, a pressure angle of the tooth surface 75a is larger than that of the tooth surface 75b. Also in the side gears 73 and 74, pressure angles of the tooth surfaces 73a and 74a are larger than those of the tooth surfaces 73b and 74b.

As shown in FIG. 7(A), in a drive mode when a rotational driving force is transmitted from the pinion gear 75 to the side gears 73 and 74, the rotational driving force is transmitted from the tooth surface 75a of the pinion gear 75 to the tooth surface 73a of the side gear 73 at the side of the side gear 73, while the rotational driving force is transmitted from the tooth surface 75b of the pinion gear 75 to the tooth surface 74b of the side gear 74 at the side of the side gear 74. At this time, a meshing reaction force in a thrust direction is generated in the side gear 73 which is indicated by the arrow Dr1 in FIG. 7(A), while a meshing reaction force in a thrust direction is generated in the side gear 74 which is indicated by the arrow Dr2. That is, in a drive mode, a larger thrust reaction force is applied to the side gear 73 relative to the side gear 74.

As shown in FIG. 7(B), during a coast mode when a rotational driving force is transmitted from the side gears 73 and 74 to the pinion gear 75, the rotational driving force is transmitted from the tooth surface 73b of the side gear 73 to the tooth surface 75b of the pinion gear 75 at the side of the side gear 73, while the rotational driving force is transmitted from the tooth surface 74a of the side gear 74 to the tooth surface 75a of the pinion gear 75 at the side of the side gear 74. At this time, a meshing reaction force in a thrust direction is generated in the side gear 73 which is indicated by the arrow Co1 in FIG. 7(B), while a meshing reaction force in a thrust direction is generated in the side gear 74 which is indicated by the arrow Co2. That is, during a coast mode, a smaller thrust reaction force is applied to the side gear 73 relative to the side gear 74.

As shown in FIG. 6, as compared with the multiple disc clutch 81 mounted between the side gear 73 and the differential case 72, the multiple disc clutch 82 mounted between the side gear 74 and the differential case 72 has fewer friction plates 82a and friction discs 82b. Thus, as compared with the multiple disc clutch 81 as a first friction generating member, a smaller frictional force, i.e., a transmission torque capacity, is set in the multiple disc clutch 82 as a second friction generating member.

Therefore, in a drive mode, a larger thrust reaction force Dr1 is applied as a pressing force to the multiple disc clutch 81 having a larger transmission torque capacity, while a smaller thrust reaction force Dr2 is applied to the multiple disc clutch 82 having a smaller transmission torque capacity. On the other hand, during a coast mode, a smaller thrust reaction force Co1 is applied as a pressing force to the multiple disc clutch 81 having a larger transmission torque capacity, while a larger transmission thrust reaction force Co2 is applied to the multiple disc clutch 82 having a smaller transmission torque capacity. Accordingly, a frictional force generated in each of the multiple disc clutches 81 and 82, that is, a differential limiting force, becomes larger in a drive mode than during a coast mode. As a result, a larger differential limiting force can be generated in a drive mode than during a coast mode.

Although the multiple disc clutch 82 having a smaller transmission torque capacity is disposed near the side gear 74, a friction reducing member such as a thrust bearing or thrust washer may be disposed thereon in place of the multiple disc clutch 82 as a friction generating member. In this way, a larger difference can be set between a differential limiting force in a drive mode and that during in a coast mode.

Not limited to the multiple disc clutches 81 and 82, the friction generating member may be a disc clutch of wet type or dry type. In the disc clutch, an intensity of a frictional force can be varied by changing an outer dimension or inner diameter dimension.

Figure 8:
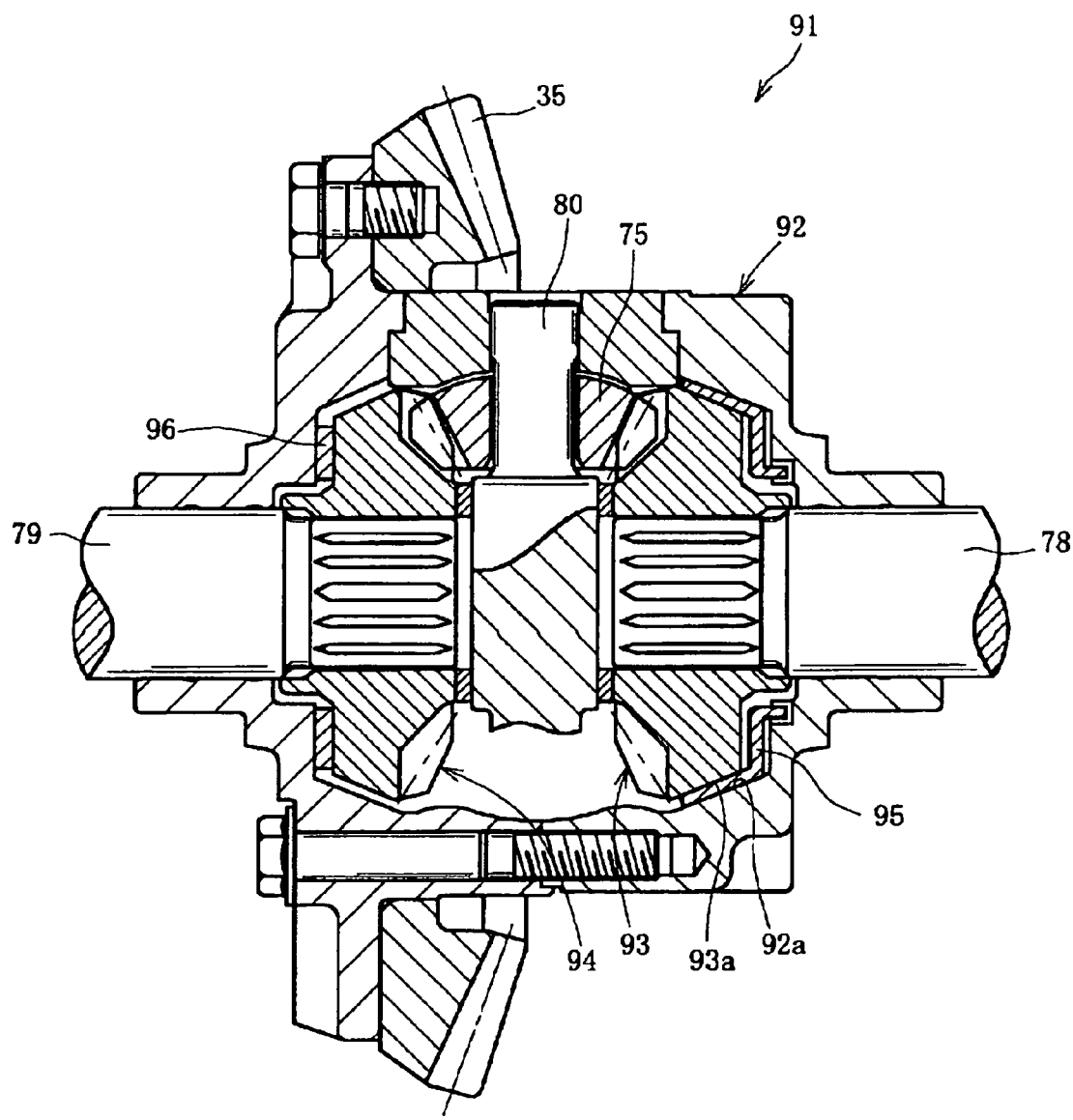
FIG. 8 is a cross-sectional view showing a differential apparatus of another embodiment according to the present invention.

FIG. 8 is a cross-sectional view showing a differential apparatus 91 of another embodiment according to the present invention. In FIG. 8, the members common to those shown in FIG. 6 have the same reference numbers, and their detailed description is omitted.

As shown in FIG. 8, two side gears 93 and 94 as first and second driven gears are rotatably housed in a differential case 92. Front wheel driving shafts 78 and 79 are respectively spline-connected to the side gears 93 and 94. The side gears 93 and 94 are formed as bevel gears. The side gears 93 and 94 respectively have teeth at one end surfaces thereof which are meshed with the pinion gear 75. A tapered surface 93a is formed at the other end surface of the side gear 93. A tapered surface 92a corresponding to the tapered surface 93a of the side gear 93 is formed at an inner periphery of the differential case 92 housing the side gear 93.

A tapered ring 95 as a friction generating member is mounted between the side gear 93 and the differential case 92, the tapered ring 95 being capable of contacting the tapered surfaces 92a and 93a. A thrust washer 96 as a friction reducing member is mounted between the side gear 94 and the differential case 92. That is, at the side of the side gear 93, there is disposed the tapered ring 95 having a larger friction force, i.e., a larger transmission torque capability than the thrust washer 96.

Similar to the front differential apparatus 71 shown in FIG. 6, tooth shapes of the pinion gear 75 and the side gears 93 and 94 have asymmetrical pressure angles. Thus, in a drive mode, a larger thrust reaction force is applied to the side gear 93, while during a coast mode, a larger thrust reaction force is applied to the side gear 94.

Therefore, in a drive mode, a larger thrust reaction force is applied as a pressing force to the tapered ring 95 having a larger transmission torque capacity, while a smaller thrust reaction is applied to the thrust washer 96 having a smaller transmission torque capacity. On the other hand, during a coast mode, a smaller thrust reaction is applied to the tapered ring 95 having a larger transmission torque capacity, while a larger thrust reaction force is applied to the thrust washer 96 having a smaller transmission torque capacity. As a result, a friction force, i.e., a differential limiting force generated in the tapered ring 95, becomes larger in a drive mode than during a coast mode, so that a larger differential limiting force can be generated in a drive mode than during a coast mode.

In place of the thrust washer 96 disposed near the side gear 94, a thrust bearing as a friction reducing member may be disposed thereon. Also, a tapered ring having a smaller transmission torque capacity than the tapered ring 95 disposed near the side gear 93 may naturally be disposed thereon.

As described above, by employing the differential apparatus 10, 11, 71, and 91 respectively having the pinion gears 39, 40, 63, and 75 in which the adjacent tooth surfaces have different pressure angles from each other, a large difference can be set between differential limiting forces in a drive mode and during a coast mode. Specifically, when a larger differential limiting force is set in a drive mode, and a smaller differential limiting force is set during a coast mode, contradictory performances of an automobile such as the turning performance and the acceleration performance can be made compatible with each other at high levels, so that the power performance of the automobile can be enhanced.

The differential apparatus 10, 11, 71, and 91 need no additional element, only the pressure angles of the pinion gears 39, 40, 63 and 75 being asymmetrically formed. Thus, an increase of the cost for the differential apparatus 10, 11, 71, and 91 can be restrained, while enhancing the power performance of the automobile. In addition, unnecessary differential limiting force can be reduced during a coast mode so as to improve fuel consumption, as well as the performance of an anti-lock brake system.

Of course the present invention is not limited to the above embodiments, and various changes and modifications are possible without departing from the scope of the invention.

For example, the front differential apparatus 11, 71, and 91 shown respectively in FIGS. 2, 6, and 8 may be used as rear differential apparatus for distributing a rotational driving force to the right and left rear wheels. Alternatively, the front differential apparatus 11, 71, and 91 may be used as center differential apparatus for distributing a rotational driving force to the front and rear wheels by changing a shape of the ring gear 35, or by inputting an output from a transmission to a differential case.

Further, although the transmission shown in FIG. 1 is the manual transmission 12 for a four-wheel drive automobile, the manual transmission may be for a front-wheel drive automobile or a rear-wheel drive automobile. Not limited to a manual transmission, the differential apparatus according to the present invention may be housed in other transmission such as an automatic transmission or a continuous transmission.

In addition, it has been described that an accelerator is on in a drive mode, while an accelerator is off during a coast mode. However, the driving mode and the coast mode are determined according to the meshed tooth surfaces of the respective gears. Thus, when an accelerator is depressed when reversing, for example, the same meshing reaction force as that during a coast mode as described above is naturally generated.

According to the present invention, since adjacent tooth surfaces of the driving gear are formed to have different pressure angles from each other, different meshing reaction forces can be generated according to the meshing direction of the driven gear with the driving gear. Thus, a difference in differential limiting forces can be set by the meshing reaction forces.

As a result, a large difference in the differential limiting forces can be set in a drive mode and during a coast mode. For example, when a larger differential limiting force is set in a drive mode, while a smaller differential limiting force is set during a coast mode, contradictory performances of an automobile such as the turning performance and the acceleration performance can be made compatible with each other at high levels, so that the power performance of the automobile can be enhanced.

Further, the disclosure of Japanese Patent Application No. 74437/2003 filed on Mar. 18, 2003, including the specification, drawings and abstract, is incorporated by reference in its entirety.

The invention claimed is:

1. A differential apparatus for distributing a rotational driving force from a transmission output shaft to a first driving wheel and a second driving wheel comprising:

a first driving shaft connected to the first driving wheel;

a second driving shaft connected to the second driving wheel;

a driven gear disposed on the first driving shaft; and a driving gear which is positioned near the transmission output shaft to be meshed with the driven gear; wherein adjacent tooth surfaces of the driving gear are formed to have different pressure angles from each other, and a differential limiting force is generated by a meshing reaction force which is varied depending on a meshing direction of the driving gear, and said differential apparatus further comprising:

a differential case connected to the transmission output shaft;

a first driving gear which is housed in the differential case to be meshed with a first driven gear disposed on the first driving shaft;

a second driving gear which is housed in the differential case to be meshed with a second driven gear disposed on the second driving shaft; and an intermediate gear which is integrally disposed on the second driving gear to be meshed with the first driving gear.

2. A differential apparatus for distributing a rotational driving force from a transmission output shaft to a first driving wheel and a second driving wheel comprising:

a first driving shaft connected to the first driving wheel;

a second driving shaft connected to the second driving wheel;

a driven gear disposed on the first driving shaft; and a driving gear which is positioned near the transmission output shaft to be meshed with the driven gear; wherein adjacent tooth surfaces of the driving gear are formed to have different pressure angles from each other, and a differential limiting force is generated by a meshing reaction force which is varied depending on a meshing direction of the driving gear and said apparatus further comprising:

a carrier which is connected to the second driving shaft to rotatably support the driving gear; and an intermediate gear which is integrally disposed on the driving gear to be meshed with an output gear disposed on the transmission output shaft.

3. The differential apparatus according to claim 1 or 2, wherein a tooth surface of the driving gear for transmitting a rotational driving force in a drive mode is formed to have a larger pressure angle than that of a tooth surface to which the rotational driving force is transmitted during a coast mode.

4. The differential apparatus according to claim 1 or 2, wherein the driving gear is formed in a cylindrical shape, and a differential limiting force is generated by a radial meshing reaction force which is applied to the driving gear.

5. The differential apparatus according to claim 4, wherein the differential limiting force is a frictional force generated in the driving gear and a housing bore of the differential case housing the driving gear.

6. The differential apparatus according to claim 4, wherein the differential limiting force is a frictional force generated in the driving gear and a support shaft of the carrier supporting the driving gear.

7. A differential apparatus for distributing a rotational driving force from a transmission output shaft to a first driving wheel and a second driving wheel comprising:

a first driving shaft connected to the first driving wheel;

a second driving shaft connected to the second driving wheel;

a driven gear disposed on the first driving shaft; and a driving gear which is positioned near the transmission output shaft to be meshed with the driven gear; wherein adjacent tooth surfaces of the driving gear are formed to have different pressure angles from each other, and a differential limiting force is generated by a meshing reaction force which is varied depending on a meshing direction of the driving gear, and said differential apparatus further comprising a differential case which houses therein the driving gear, and is connected to the transmission output shaft; wherein the driving gear is meshed with both the first driven gear connected to the first driving shaft, and the second driven gear connected to the second driving shaft; and wherein a friction generating member is disposed between the first driven gear and the differential case, and a friction reducing member is disposed between the second driven gear and the differential case and wherein the friction generating member is a friction clutch.

* * * * *